United States Patent
Nacenta Anmella

(10) Patent No.: US 9,204,658 B2
(45) Date of Patent: Dec. 8, 2015

(54) PROCESS FOR THE PRODUCTION OF FROZEN FOODS, PARTICULARLY VEGETABLES OR FRUITS

(75) Inventor: Jose Maria Nacenta Anmella, Barcelona (ES)

(73) Assignee: UNIVERSITAT POLITECNICA DE CATALUNYA, Barcelona (ES)

( * ) Notice: Subject to any disclaimer, the term of this patent is extended or adjusted under 35 U.S.C. 154(b) by 866 days.

(21) Appl. No.: 12/600,541

(22) PCT Filed: May 21, 2008

(86) PCT No.: PCT/ES2008/000352
§ 371 (c)(1),
(2), (4) Date: Jan. 8, 2010

(87) PCT Pub. No.: WO2008/142187
PCT Pub. Date: Nov. 27, 2008

(65) Prior Publication Data
US 2010/0143564 A1    Jun. 10, 2010

(30) Foreign Application Priority Data

May 22, 2007   (ES) .................................... 2007 1391

(51) Int. Cl.
| | |
|---|---|
| A23B 7/10 | (2006.01) |
| A23B 7/16 | (2006.01) |
| A23B 7/024 | (2006.01) |
| A23B 7/05 | (2006.01) |
| A23B 7/02 | (2006.01) |
| A23L 1/212 | (2006.01) |

(52) U.S. Cl.
CPC ... *A23B 7/05* (2013.01); *A23B 7/02* (2013.01); *A23L 1/2123* (2013.01)

(58) Field of Classification Search
CPC ............ A23B 7/024; A23B 7/05; A23B 7/02; A23B 7/14; A23B 7/153; A23B 7/157; A23B 7/0205; A23B 7/0215; A23B 7/055; A23L 3/375; A23L 3/363; A23L 3/37; A23L 3/34; A23L 3/3454; A23L 3/36; A23L 1/212
USPC ......... 426/393, 524, 546, 384, 541, 327, 331, 426/333, 615, 616
See application file for complete search history.

(56) References Cited

U.S. PATENT DOCUMENTS

| | | | | |
|---|---|---|---|---|
| 2,364,049 | A | * | 12/1944 | Bensel .......................... 426/106 |
| 2,703,761 | A | | 3/1955 | Todd |
| 2,783,545 | A | * | 3/1957 | Booth .............................. 34/429 |
| 3,009,814 | A | * | 11/1961 | Rivoche ........................ 426/481 |
| 3,297,454 | A | * | 1/1967 | Webster et al. .................... 62/63 |
| 6,531,171 | B2 | * | 3/2003 | Armand et al. ................ 426/321 |
| 8,445,048 | B2 | * | 5/2013 | Rogers et al. ................. 426/438 |
| 2007/0110859 | A1 | | 5/2007 | Goldman et al. |
| 2009/0317523 | A1 | * | 12/2009 | Hirschberg et al. ........... 426/241 |
| 2011/0027439 | A1 | | 2/2011 | Rosich Ferrer |

FOREIGN PATENT DOCUMENTS

| | | |
|---|---|---|
| EP | 0 401 450 A1 | 12/1990 |
| EP | 2 260 715 A1 | 12/2010 |
| FR | 2 878 412 A1 | 6/2006 |
| GB | 1 051 290 A | 12/1966 |
| GB | 1319380 A | 6/1973 |
| SU | 1796119 * | 2/1993 |
| WO | 98/46074 A1 | 10/1998 |
| WO | 01/03516 A1 | 1/2001 |

OTHER PUBLICATIONS

SU 1796119, Derwent Abstract, 1993.*
Machine Translation WO2009125041. Oct. 2009.*
Lucas, T., et al., "Immersion chilling and freezing in aqueous refrigerating media: review and future trends", Int. J. Refrig, 1998, pp. 419-429, vol. 21, No. 6.
Madrid, A. et al., "Refrigeración, congelación y envasado de los alimentos: Congelación de frutas y verdura", Mundi-prensa, AMV Ediciones, Madrid, 2003, pp. 77-78.
International Search Report dated Aug. 28, 2008, issued in International Application No. PCT/ES 2008/000352.
Extended European Search Report dated Nov. 24, 2011, in European Patent Application No. 08 761 595.1.

* cited by examiner

*Primary Examiner* — Rena L Dye
*Assistant Examiner* — Lela S Williams
(74) *Attorney, Agent, or Firm* — Sughrue Mion, PLLC

(57) ABSTRACT

A process for the production of frozen foods, particularly vegetables or fruits, including the stages of subjecting the food to a slight and slow dehydration, preferably by air convection, to partially eliminate its water content by between approximately 2 and 10% by weight, especially its outermost layer; allowing the food to rest to favor the redistribution of the free water contained therein and subjecting the food, after its packaging, to a rapid convection freezing treatment, either by immersion in an aqueous solution of salts or by the use of liquid nitrogen. In the case of chopped fruits, before the dehydration stage the portions are sprayed with an antioxidant product.

11 Claims, No Drawings

PROCESS FOR THE PRODUCTION OF FROZEN FOODS, PARTICULARLY VEGETABLES OR FRUITS

TECHNICAL FIELD OF THE INVENTION

The invention relates to a process for the production of frozen foods, particularly applicable for the freezing of medium- and small-sized fruit, both in whole individual pieces and pieces which are peeled and cut into portions.

BACKGROUND OF THE INVENTION

Different processes for the production of frozen food products are currently known, the main objective of which is that the product preserves its original organoleptic properties after it is thawed.

Most of the known processes cannot assure the preservation of the structure of the fruit and of some vegetables when they are thawed, mainly due to the large amount of water contained therein. Fruits normally contain more than 90% of water by weight.

With reference to very small-sized fruit, such as wild berries, although slow convection freezing systems (nitrogen vapors, $CO_2$ or very cold air) are used, the freezing of the fruit occurs rapidly since its grains are small in size, therefore there is not enough time for the water to come out of the cell walls. The immediate consequence is that when these fruits thaw they relatively maintain their initial structure.

With reference to other fruits, convection freezing causes a freezing that is too slow, therefore the water freezes forming large crystals which break the structure of the fruit. When the fruit subsequently thaws, the water comes out of it, leaving the fruit with an appalling texture.

If the freezing is carried out by convection in liquids, i.e., immersing the product inside a bath with liquid nitrogen (at about $-200°$ C.), liquid carbonic anhydride (at about $-80°$ C.) or an aqueous solution optionally stirred at a very low temperature (between $-50°$ and $-35°$ C.), the freezing speed of the products is much quicker and the water freezes in the form of microscopic crystals which do not come out of the cells. The texture of the food consequently does not change and when the product thaws it maintains the original color, taste and texture.

The more rapidly a product has been frozen, the less liquid it releases upon thawing. At domestic level it is known that meat or fish must be left to thaw on a plate, so that the released liquid does not dirty the kitchen marble. A cause of this can be that it has been frozen by air convection, or that the freezing has been slow and the structure of said foods has been slightly broken. The lower the percentage of water the food has, the lower is the effect described.

Another reason producing liquid when the products thaw is that the cold chain has been broken at some time, the products being frozen again poorly. In many freezers of specialized stores, bags of frozen products with frost can be seen, which indicates a possible temporary breakage of the cold chain.

Another problem of freezing is that when water freezes its volume increases, therefore if a food with high water content is frozen, such as ripe fruit, the volume of the latter increases, many cracks in the surface or internal breakages occurring which cause irreparable damage in the food, losing its good appearance after thawing.

To solve these drawbacks, patent document US 2004/096559 describes a process for freezing vegetables or fruits, in which the products are partially dehydrated to considerably reduce the original water content of the product. According to this process, the products are dehydrated by means of hot air at a temperature greater than $90°$, the water content preferably being reduced by between 25% and 60%. They are subsequently subjected to an ultrarapid freezing treatment, immersing the products in a bath of liquid nitrogen or of liquid carbon dioxide at a temperature close to $-200°$ C. Upon thawing, the products maintain their taste, but not their appearance, since a very considerable part of their water has been removed from them.

For the purpose of reducing the size of the ice crystals produced inside the fruits subjected to a freezing process, patent document EP 1525801 describes a process in which the fruit is subjected to a regime of temperature reduction in stages. The fruit is slowly cooled to $0°$ C., it is subsequently slowly under-cooled to a temperature between $-8°$ C. and $-12°$ C. at a cooling rate from $10°$ C. to more than $40°$ C. per hour, so that the temperature difference between the surface and the inside is $1.5°$ C.; and finally it is additionally cooled until ice formation occurs. Although this process achieves preserving the taste of the fruit better than other alternative processes, in which the fruit is sprayed with sugary powders or fluids, it is aimed at the fruits being consumed in their frozen state. In the event that the fruits are thawed, they considerably lose their original texture.

Patent documents FR 2878412, EP 0572745 and U.S. Pat. No. 6,004,607 describe a process in which the products are immersed in an aqueous solution for a superficial pre-freezing, before being cooled or frozen using conventional methods. According to these documents, upon immersing the products in the aqueous solution the freezing of the envelopment of the fruit, of its outermost layer, occurs, without the freezing of the core of the fruit occurring for the moment, which reduces the damage subsequently caused in the envelopment of the product when ice crystals are formed therein. These processes have, nevertheless, an important drawback, which is the change of taste conferred to the immersed products by the products added to the aqueous solution to decrease the freezing point of the water. The products usually used are sodium chloride, calcium chloride, sugars or alcohols.

An objective of the present invention is to disclose a quick and cost-effective process for the production of frozen foods, in which the breakage of the internal structure of the foods is not prevented, so that once thawed their appearance, taste, odor and texture are similar to those which they had before they were frozen.

DISCLOSURE OF THE INVENTION

The process according to the invention solves the drawbacks of the processes known up until now, and allows the continuous production of frozen whole fruits with a reasonable cost from the smallest ones (wild berries, strawberries, . . .) to those with a medium size (apples, pears, kiwis, peaches, oranges, . . . ) as well as of fruit which is generally peeled, cut and chopped up (melon, papaya, . . . ) without the original texture, appearance, odor and taste thereof being substantially changed upon thawing.

The process according to the invention is essentially characterized in that it comprises the steps of subjecting the food to a slow and slight dehydration treatment to partially eliminate the water content of the food, especially of its envelopment or of its outermost layer, by between approximately 2% and approximately 10% by weight; and once the water contained in the food is redistributed, subjecting the food to a rapid convection freezing treatment.

In relation to fruits, it has been verified, for example, that for very thin portions or for some types of fruit, such as grapes, the redistribution of the contained water occurs in a natural manner simultaneously to the dehydration operation, whereas in other more generalized cases it is necessary to allow the fruit to rest to favor the redistribution of the water.

According to a variant of the invention, before freezing the food, the latter is allowed to rest to favor the redistribution of the free water contained therein, preferably for a period comprised between approximately 1 hour and approximately 24 hours.

According to another feature of the invention, the dehydration treatment is carried out by convection by means of a stream of humid but non-saturated air at a temperature less than 15° C. and at a suitable humidity, for example 50% or less for the purpose of better preserving the organoleptic and nutritional properties of the food.

According to a variant of the invention, the rapid freezing treatment is by immersion in an aqueous solution at a temperature between approximately −30° C. and approximately −50° C. according to the type and size of the food.

According to an embodiment of this variant of the invention, the aqueous solution contains betaine, at a suitable concentration for maintaining the water in liquid state at a temperature between approximately −35° C. and approximately −50° C.

According to another embodiment of this variant of the invention, the food is fruit and the aqueous solution contains a food-grade soluble substance, such as potassium acetate or calcium chloride, at a suitable concentration for maintaining the water in liquid state at a temperature between approximately −35° C. and approximately −50° C.

According to an embodiment, the food is packaged under a partial vacuum before being subjected to the rapid freezing treatment.

According to another variant of the invention, the rapid freezing treatment is carried out by means of the intervention of liquid nitrogen.

According to another feature of the invention, the food is frozen fruit and the latter is chopped up before being subjected to the dehydration treatment, the portions of fruit being sprayed with an antioxidant product, such as ascorbic acid.

DETAILED DESCRIPTION OF THE INVENTION

The steps contemplated by the invention, applicable for the freezing of fruit, are detailed below:
  a) The starting point is ripe fruit, preferably ripened naturally in the tree in order to freeze it soon after it is picked, in its best state of taste and appearance.
  b) The harvested fruit is classified by size, it is subjected to a wash and subsequent drying and the unsuitable pieces are removed.
  c) The fruit is subjected for a variable time, depending on the ripening degree, on the size and on the type of fruit, to a slight dehydration treatment preferably by means of a stream of cold air with a humidity preferably comprised between 60% and 70% at a temperature between 5° C. and 10° C., in order to slightly reduce the water content of the fruit, especially of the envelopment or of its outermost layer, approximately by between 2% and 10% by weight, depending on the type of fruit. The invention contemplates the possibility of using other methods for the dehydration of the fruits; such as for example that which is carried out by immersion in a saline solution or sugary solution, and in which the water comes out from inside the products by osmotic pressure. Nevertheless, the method by air convection is preferred since the use of aqueous solutions entails the entrance of sugar, or the substance dissolved in the water, in the fruit and affects the original properties thereof.
  d) If the size of the portions or the type of fruit requires it, the internal water remaining in the fruit is stabilized, allowing the fruit to rest for a period comprised between 1 and 24 hours, depending on the type of fruit, in a cold room, favoring first the redistribution of the extracellular water from the inside to the outside (to balance the extracellular water in the entire fruit), as well as that a small part of the intracellular water becomes part of the extracellular water, to maintain the internal balance of the water inside the mass of the fruit.
  e) If the fruit is peeled and chopped up, before the previous operation and to prevent the oxidation of the fruit, it is sprayed with an antioxidant, for example with ascorbic acid.
  f) Optionally, the fruit obtained from the previous operations is packaged under vacuum with an air-tight, flexible and preferably transparent and retractable wrapping, so that the latter is in direct contact both with the fruit and with the freezing liquid, facilitating the transmission of the cold by convection from the freezing liquid to the wrapping and by conduction through the material from which said plastic wrapping is formed and the fruit itself. This wrapping prevents the direct contact of the fruit with the freezing liquid to prevent the fruit from being contaminated and acquiring an unpleasant taste by osmosis. Since it is transparent, it allows seeing the appearance of the product at all times.
  g) The packaged fruit is subjected to a rapid freezing treatment by immersion in an aqueous solution of organic or inorganic salts under stirring, which maintain the water in liquid state despite the fact that the temperature thereof is less than −50° C., for a time comprised between 2 and 10 minutes depending on the type and size of the fruit.
    Alternatively, the fruit can be introduced in a liquid nitrogen tunnel. These tunnels consist of an insulated enclosure through which the products circulate by means of a conveyor system, at an adjustable speed. In the last third of the conveyor, a spraying ramp scatters the liquid nitrogen (−196° C.) in very fine drops on the product. The cold gas resulting from the vaporization moves by the action of fans in countercurrent with the product, which favors an excellent thermal efficiency in the installation.
    As a result, the water freezes in the form of thousands of microscopic crystals, which does not affect the integrity or the structure of the cells at all. It has been verified that when the fruit subsequently thaws, it does not release a single drop of liquid, virtually maintaining the same appearance, taste, odor and texture as before the freezing. This liquid freezing process is much more cost-effective than the bath of liquid nitrogen or sprays of carbonic anhydride.
  h) After this treatment the frozen product can be kept for months, transported and marketed in freezer rooms the temperature of which is less than −18° C. Great care must be taken to assure that the cold chain is not broken, since the re-freezing would occur in unsuitable circumstances and upon thawing the texture of the fruit would be modified.

In relation to the nature of the aqueous solutions used, from among the existing possibilities, and in the event that the fruit is immersed directly in the aqueous solution without being previously packaged, it has been possible to verify that when the solution is of betaine the obtained results are drastically improved with respect to saline solutions, since the taste of the produced fruit does not vary substantially.

EXAMPLE 1

Whole Peach with its Skin

The fruit ripened in the tree is first washed and dried.

Then, the unpeeled peach is subjected to a slight dehydration treatment by means of a stream of cold air with a relative humidity of 70% for an approximate period of 30 minutes, the water content contained in the portions of peach being reduced by approximately 5% by weight.

The peach is allowed to rest in a cold room for a period of 24 hours, the remaining water content being stabilized.

Once the rest and stabilization period has concluded, the peach can be packaged under vacuum in a retractable plastic bag, which is immersed in an aqueous solution at −50° C., such as an aqueous solution of potassium acetate, subjected to continuous stirring to facilitate the heat exchange, for an approximate time of 10 minutes.

Once the package and its content have been subjected to the conduction freezing treatment, the package can be stored in a conventional freezer at approximately −18° C. until it is consumed, after natural thawing.

EXAMPLE 2

Chopped Peach

The process starts by peeling and pitting the pieces of fruit. Each piece is chopped up into several individual portions.

Subsequently, the obtained portions are subjected to a bath of ascorbic acid which acts as an antioxidant element, the oxidation of the surface and its color change thus being prevented.

The portions are then subjected to a slight dehydration treatment by means of a stream of cold air with a relative humidity of 70% for an approximate period of 30 minutes, the water content contained in the portions of peach being reduced by approximately 5% by weight.

The dehydrated portions are allowed to rest in a cold room for a period of 24 hours, the water content remaining therein being stabilized.

Once the rest and stabilization period has concluded, the portions of peach are packaged under vacuum in a retractable plastic bag, which is immersed in an aqueous solution of potassium acetate at −35° C., subjected to continuous stirring to facilitate the heat exchange, for an approximate time of 10 minutes.

Once the package and its content have been subjected to the conduction freezing treatment, the package can be stored in a conventional freezer at approximately −18° C. until it is consumed, after natural thawing.

EXAMPLE 3

Grapes

The grapes are first washed and dried and then they are subjected to a dehydration treatment similar to the one described in the previous examples.

Unlike the other examples, the grapes are then subjected to a rapid freezing treatment without needing to allow the grapes to rest. In this case, the rapid freezing treatment is carried out, for example, in a liquid nitrogen tunnel in which there are distinguished a first area, through which the product enters, an area of gas—product cold exchange, which forms the longest section of the tunnel and in which the gaseous nitrogen circulates in countercurrent with the product as a result of a ventilation system; and a spraying area, in which the injection of liquid nitrogen on the product takes place to complete the freezing thereof.

Alternatively, the freezing can also be carried out by the method of immersion in a liquid at a temperature comprised between −35 and −50° C., as has been previously described.

EXAMPLE 4

Nectarines

To freeze medium portions of nectarine with skin, a bath of the product in water with ascorbic acid or another antioxidant is first carried out. The portions are dehydrated with a stream of air at 5° C., for example, and a humidity of 20% such that after 2 or 3 hours they have already lost 10% of their weight.

Subsequently, the dehydrated portions are allowed to rest for 2 hours and wrapped in plastic, performing a partial vacuum before their rapid freezing by immersion in a bath of water with calcium chloride at −40° C. for 7 minutes, or being introduced in a liquid nitrogen tunnel.

EXAMPLE 5

Melon

To freeze melon chopped up into pieces with a thickness of 2 cm, the bath of the pieces with water with ascorbic acid or another antioxidant is carried out. The pieces are then dehydrated with air at 5° C. and a humidity of 20% such that after 1 hour they have already lost 10% of their weight. They are allowed to rest for 30 minutes and then they are frozen either by a bath in saline solution, after packaging under a partial vacuum, at −40° C. or by means of a liquid nitrogen tunnel.

The invention claimed is:

1. A process for the production of frozen foods, comprising the steps of:
    i) subjecting the food to a dehydration treatment to partially eliminate the water content of an outermost layer of the food by between approximately 2% and approximately 10% by weight; and
    ii) once the free water contained in the food has been redistributed, subjecting the food to a rapid convection freezing treatment;
    wherein the dehydration treatment is carried out by convection blowing air having a humidity of 20% to 70% at a temperature less than 15° C.; and
    wherein before freezing the food, the food is allowed to rest to favor the redistribution of the free water contained therein.

2. The process according to claim 1, wherein the food is allowed to rest for a period comprised between approximately 1 hour and approximately 24 hours.

3. The process according to claim 1, wherein the rapid freezing treatment is by immersion of the food in an aqueous solution at a temperature between approximately −30° C. and approximately −50° C.

4. The process according to claim 3, wherein the food is fruit and the aqueous solution contains betaine at a suitable concentration for maintaining the water in liquid state at a temperature between approximately −35° C. and approximately −50° C.

5. The process according to claim 1, wherein the food is packaged under a vacuum before being subjected to the rapid freezing treatment.

6. The process according to claim 3, wherein the food is fruit and the aqueous solution contains a food-grade soluble substance at a suitable concentration for maintaining the water in liquid state at a temperature between approximately −35° C. and approximately −50° C.

7. The process according to claim 1, wherein the rapid freezing treatment is carried out by intervention of liquid nitrogen.

8. The process according to claim 1, wherein the food is fruit, which is chopped up before being subjected to the dehydration treatment, wherein the portions of fruit are sprayed with an antioxidant product.

9. The process according to claim 1, wherein the food is a fruit or a vegetable.

10. The process according to claim 6, wherein the food-grade soluble substance is potassium acetate or calcium chloride.

11. The process according to claim 8, wherein the antioxidant product is ascorbic acid.

\* \* \* \* \*